(12) United States Patent
Johnson et al.

(10) Patent No.: US 7,004,999 B2
(45) Date of Patent: Feb. 28, 2006

(54) APPARATUS FOR SEPARATING FOULING CONTAMINANTS FROM NON-CONDENSABLE GASES AT THE END OF A PYROLYSIS/THERMOLYSIS OF BIOMASS PROCESS

(75) Inventors: Warren L. Johnson, North Vancouver (CA); Gholam H. Yavari, North Vancouver (CA); Desmond St. A. G. Radelin, Waterloo (CA)

(73) Assignee: Dynamotive Energy Systems Corporation, Vancouver (CA)

( * ) Notice: Subject to any disclaimer, the term of this patent is extended or adjusted under 35 U.S.C. 154(b) by 249 days.

(21) Appl. No.: 10/642,333

(22) Filed: Aug. 18, 2003

(65) Prior Publication Data

US 2005/0039599 A1  Feb. 24, 2005

(51) Int. Cl.
*B01D 50/00* (2006.01)
*B01D 45/12* (2006.01)

(52) U.S. Cl. .......................... 95/271; 96/188; 55/315.1; 55/459.1; 55/434; 201/4

(58) Field of Classification Search ................. 95/271; 96/188, 189, 190; 55/315, 315.1, 434, 459.1; 201/3, 4
See application file for complete search history.

(56) References Cited

U.S. PATENT DOCUMENTS

| | | |
|---|---|---|
| 4,072,478 A | 2/1978 | Regehr et al. |
| 4,190,426 A | 2/1980 | Ruschke |
| 4,583,998 A | 4/1986 | Reid et al. |
| 4,668,254 A | 5/1987 | Wamsley, Jr. |
| 4,941,897 A | 7/1990 | Vann, III |
| 5,108,472 A | 4/1992 | Murray, Sr. |
| 5,115,084 A * | 5/1992 | Himmelblau ............... 528/230 |
| 5,154,742 A | 10/1992 | Gault et al. |
| 5,397,582 A * | 3/1995 | Underwood et al. ........ 426/250 |
| 5,728,271 A | 3/1998 | Piskorz et al. |
| 5,792,340 A * | 8/1998 | Freel et al. ................. 208/127 |
| 6,261,342 B1 | 7/2001 | Rousseau et al. |
| 6,368,389 B1 | 4/2002 | Birke et al. |
| 2003/0000386 A1 | 1/2003 | West |

* cited by examiner

*Primary Examiner*—Robert A. Hopkins
(74) *Attorney, Agent, or Firm*—Vermette & Co.

(57) ABSTRACT

A method of continuously capturing BioOil and its constituents from a gas stream produced in a fast pyrolysis/thermolysis process, in a usable liquid form so as to produce a non-condensable gas free of fouling contaminates. The method includes separating BioOil and its constituents from a gas stream using hot inertial separation to maintain the temperature of said BioOil and its constituents above a temperature at which the thick and/or sticky constituents cause inefficient operation of the equipment but low enough so that they do not undergo rapid degradation. Next the gas velocity is reduced to a temperature sufficiently low to allow droplets in the gas stream to settle out but high enough so that a viscosity of said droplets remains low enough to avoid inefficient operation of the separation equipment. Finally, liquid is condensed out of the gas stream.

20 Claims, 1 Drawing Sheet

APPARATUS FOR SEPARATING FOULING CONTAMINANTS FROM NON-CONDENSABLE GASES AT THE END OF A PYROLYSIS/THERMOLYSIS OF BIOMASS PROCESS

FIELD OF INVENTION

The present invention relates to the continuous collection of aerosol and liquid droplets from the gas stream resulting from a pyrolysis/thermolysis of biomass process before it causes fouling and coking/carmelization and, therefore, operation stoppage of downstream equipment.

BACKGROUND OF THE INVENTION

The fast pyrolytic production of liquids from biomass has progressed with the development of improved techniques. Such liquids are termed BioOil. BioOil is a generic term known in the industry and is produced by converting organic residues such as forest and agricultural wastes in a fast pyrolysis process. BioOil is thermally unstable, being prone to polymerization/carmelization and thermal cracking when exposed to elevated temperatures for prolonged periods of time. These products are in the form of gasses, aerosols, vapours and char. In this process, the char is first removed with cyclone separators. Because of the thermally unstable nature of the BioOil product normal surface condensers are inefficient and subject to extreme fouling. As well, the BioOil vapour is subject to chemical degradation. Consequently most processes follow the cyclone separators with a quench tower for rapid cooling, condensation and coalescence of the BioOil. Nevertheless, there remains a significant amount of stable aerosols in the effluent gas stream. Filtration or electrostatic precipitations are usually employed to clean the gas stream further. These systems are not ideal as they suffer variously from high-pressure drops, expensive maintenance or high capital cost. Thus is especially so for biomass feedstocks rich in resins and waxes, such as sugar cane bagasse and bark rich wood residues.

There are different types of the equipment available in industries such as oil and gas processing plants, which collect aerosol and liquid droplets from a gas stream such as scrubbers, filters, wet cyclones, mesh pad and impingement type separators. However, these are ineffective in capturing BioOil droplets and sub-micron aerosols.

BioOil droplets, which appear as liquid droplets, and sub-micron aerosols have different properties from hydrocarbon aerosols. Whereas hydrocarbon liquid evaporates at moderates temperatures, BioOil droplets are very sticky and will polymerize and eventually form coke if heated. Because of the sub-micron size of the aerosol, it is not possible to collect the entire aerosol with the above-mentioned equipment without special filters. The concentration of aerosol and liquid droplets constitutes approximately 20% of the BioOil production. Because of BioOil stickiness and the presence of other particles, filters will foul quickly.

Such filters are very expensive to replace and have problems associated with waste disposal.

The thermolysis/pyrolysis process and BioOil production with feedstocks that contain some wax and different types of extractives cause serious problems in the BioOil production process. These problems lead to an increase in production and maintenance costs. Problems such as equipment fouling, coking/caramelization and polymerization of BioOil aerosols in the gas compressor, gas heat exchangers and electrostatic precipitator increases the production and maintenance cost and makes the continuous operation of the process difficult and expensive.

Techniques for separating aerosol and waxy components from the non-condensable or recyclable gases produced in a pyrolysis/thermolysis of biomass process, especially when using bark and bagasse which contain wax and extractive, were previously unknown. Devices such as cyclones, scrubbers, filters, mesh pads and impingement type separators are not able to collect sub micron BioOil/wax aerosol from the gas stream at a low operation and maintenance cost.

SUMMARY OF THE INVENTION

According to the invention there is provided a method of continuously capturing BioOil and its constituents from a gas stream produced in a fast pyrolysis/thermolysis process, in a usable liquid farm so as to produce a non-condensable gas free of fouling contaminates. The method includes separating BioOil and its constituents from a gas stream using hot inertial separation to maintain the temperature of said BioOil such that its sticky and/or thick constituents at a temperature below its point of rapid degradation and above a point at which its viscosity is low enough to avoid inefficient operation of the separation equipment. Next the droplets in the gas stream settle out in a settling section with a gas temperature high enough so that a viscosity of said droplets remains low enough to avoid inefficient operation of the separation equipment. Finally, a condensing step is carried out to condense the vapour in the gas stream.

The step of separating BioOil includes providing a first cyclone separator to collect liquid in a range of 5 microns and greater.

The step of separating BioOil may include providing a meandering pipe following the cyclone separator to collect liquid having a sub-micron particle range and coalescing the BioOil droplets by means of inertial impaction.

The method may include providing a collection tank for collecting BioOil, wax and char coupled to a discharge outlet of the first cyclone separator.

A settling section may follow the hot inertial separation section, the settling section operating in a temperature range of 30 to 50 degrees C. to increase retention time of the gas stream and slow down a rate of gas volume flow. The settling section may include a gas tank.

The method may further include providing a condensation section operating in a temperature range of 5 to 20 degrees C. coupled to an outlet of the settling section, the condensation section operative to separate out and collect condensable materials from the gas stream. The condensation section may include a gas cooler.

The method may include providing a second cyclone separator coupled to an outlet of said gas cooler operative to separate the condensate that has been re-entrained in the gas of the gas stream of the gas cooler.

A condensate collection tank may be coupled to an outlet of said second cyclone separator.

The method may include return lines coupled to outlets of the first cyclone collection tank, the gas tank and the second cyclone collection tank operative to return collected liquid to stored liquid BioOil that is coupled to an inlet of the first cyclone separator prior to the separation step.

In another aspect of the invention there is provided an apparatus for continuously capturing BioOil and its constituents from a gas stream produced in a fast pyrolysis/thermolysis process, in a usable liquid form so as to produce a non-condensable gas free of fouling contaminates. The apparatus includes a separator operative to separate BioOil and its constituents from a gas stream and to maintain the temperature of the BioOil and its constituents at a temperature such that its sticky and/or thick constituents at a temperature below its point of rapid degradation and above a point at which its viscosity is low enough to avoid inefficient operation of the separation equipment and a gas retention apparatus wherein the gas is at a temperature sufficiently low to allow droplets in the gas stream to settle out but with a temperature high enough so that a viscosity of the droplets remains low enough to avoid inefficient operation of the separation equipment.

The separator may be a first cyclone separator followed by a meandering pipe coupled to an outlet of the first cyclone separator operative to collect BioOil droplets, wax, resin, char and aerosol in a sub-micron size and greater. A BioOil, wax and char collection tank may be coupled to a liquid outlet of the first cyclone separator.

The gas retention apparatus may be a gas tank. A condensation section, operating in a temperature range of 5 to 20 degrees C., may be coupled to an outlet of gas tank, the condensation section operative to separate out and collect condensable materials from the gas stream.

The condensation section may include a gas cooler. A second cyclone separator may be coupled to an outlet of the gas cooler to collect condensate that has been re-entrained in the gas stream in the gas cooler. A condensate collection tank may be coupled to an outlet of the second cyclone separator.

The apparatus may include return lines coupled to outlets of the first cyclone collection tank, the gas tank and the condensate collection tank, operative to return collected liquid to BioOil stored in a product tank coupled to an inlet of the first cyclone separator.

In general, the method and apparatus, referred to as the Hot Back End System has the following benefits:
1. It reduces the moisture and aerosol load on a downstream electrostatic precipitator, making it possible to reduce the electrostatic precipitator size by 70%
2. It produces all captured products and component in an easily handled liquid form.
3. It substantially reduces or eliminates the following:
    condensation on the electrostatic precipitator insulators
    electrostatics precipitator electrode fouling
    compressor fouling
    gas heat exchanger fouling
    gas cooler fouling
    scaling on the instruments
    the pressure drop associated with filteration equipment
    environmental issues such as waste disposal due to filter or mesh replacement This invention is intended for placement after the quench tower of a biomass pyrolyser. Optionally, an electrostatic precipitator of small size may follow this system. The Hot Back End System has the effect of reducing the loading on the electrostatic precipitator or filter and to substantially or completely remove the need for cleaning them.

BRIEF DESCRIPTION OF THE DRAWING

Further features and advantages will be apparent from the following detailed description, given by way of example, of a preferred embodiment taken in conjunction with the accompanying drawings, wherein.

DETAILED DESCRIPTION WITH REFERENCE TO THE DRAWING

Figure 1:
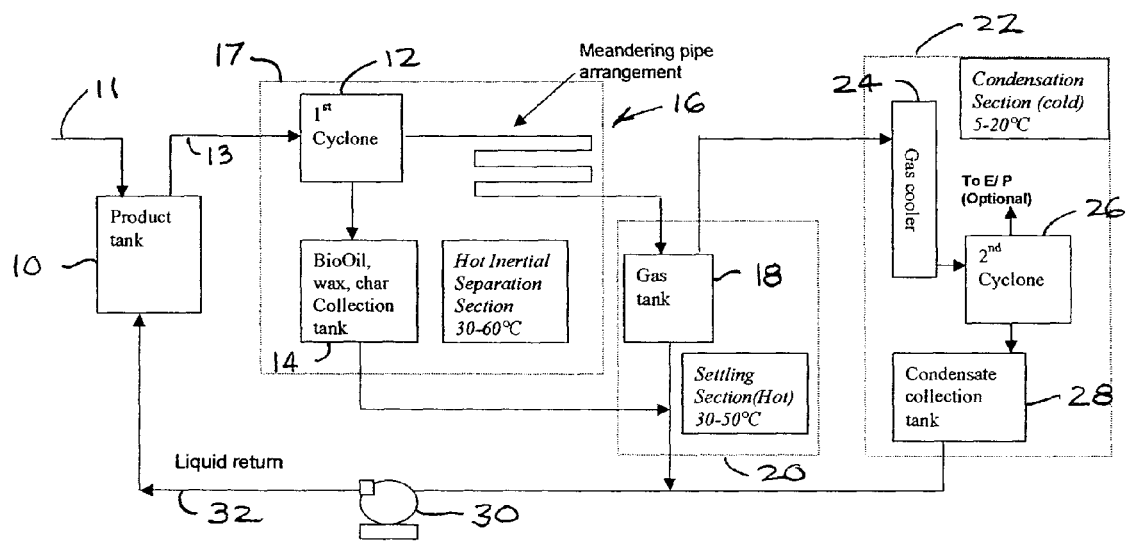
FIG. 1 is a schematic of the Hot Back End System.

Referring to FIG. 1, the pyrolysis/thermolysis process has three components, namely, a hot inertial separation section 17, a hot sedimentation section 20 and a cold condensation section 22. A product tank 10 receives pyrolyzed biomass or BioOil and other constituents which have been quenched by a quenching tower along line 11. The liquid droplets and gaseous product leaves the tank 10 along line 13 and enters a cyclone 12 in the hot inertial separation section 17 whose temperature is maintained in the range of 30 to 60 degrees C. The cyclone 12 acts as a centrifugal separator to separate the liquid BioOil of a size of 5 microns or more, aerosols, char, and wax from the gas. The liquid and other constituents are collected in a tank 14 whereas the gas is directed to a meandering pipe arrangement 16 where it undergoes inertia and impingement separation in the same temperature range as cyclone 12. This temperature range is above the sticky temperature of the waxes, extractives and aerosols. From the meandering pipe 16, the gas travels to gas tank 18 in the hot sedimentation section 20 which is kept at a temperature in the range of 30 to 50 degrees C. The gas tank 18 slows down the gas volume flow and separates the liquid from the gas stream with the help of gravity and an increased retention time. Gas from the gas tank 18 flows out to a gas cooler 24 located within a cold condenser section 22 the temperature within which is maintained in the range of 5 to 20 degrees C. The gas cooler 24 further separates condensables from the non-condensable gas. The gas from the gas cooler 24 is next directed to another cyclone 26 for separation of the condensate re-entrained in the gas cooler 24 from the non-condensable gas. Finally condensate from second cyclone 26 is collected in a condensate collection tank 28. Liquid collected from the first cyclone collection tank 14, from gas tank 18 and condensate collection tank 28 is returned through pump 30 along liquid return line 32 to the product tank 10 where it is mixed with stored liquid BioOil.

The system consisting of the cyclone 12, a special high velocity meandering piping arrangement with several 90° turns 16, a gas tank 18, a gas cooler 24 and another cyclone 26 is referred to herein as a Hot Back End System.

A Hot Back End System is located after the quench tower in a biomass pyrolysis/thermolysis system. The hot inertial separation section 17 can be made up of a variety of inertial devices maintained at a temperature of 30 to 65° C. for the removal of heavy tars, waxes and residual char. The cool section 22 which includes the gas cooler 24 maintained in 5 to 20° C. range has a second set of inertial devices for the removal of light liquids. The inertial devices may comprise cyclones, impactors and settling tanks.

Depending on the process condition approximately 10 to 50% of the total production of BioOil in the form of the vapours, aerosol and BioOil droplets travel with the recycled gas or non-condensable gases out from the hot product tank 10. It is necessary to separate these liquids from the non-condensable gases before it enters the electrostatic precipitator and the compressor (not shown) and other parts of the process equipment. The first stage of separation is right after the hot product tank 10, in which the cyclone 12 separates approximately 3 to 21% of the liquid consisting of BioOil, waxes, extractives, water and char from the non-condensable gases. The second stage consisting of the special meandering piping 16 and the gas tank 18 is the most efficient liquid separation part the of the Hot Back End system, separating approximately 4 to 14% of the liquid consisting of wax, BioOil, extractives, water and char. The collected liquid in this part is very viscous. Up to this point almost all the aerosol, wax, char, and BioOil droplets have been disengaged, and the non-condensable gases that are moving forward to the next step of liquid separation are free of these fouling contaminates. It is very important before the non-condensable gases enter the gas cooler that they be free of BioOil and especially wax, otherwise these products will rapidly foul the gas cooler. The last stage of the Hot Back End system is a gas cooler and another cyclone to disengage the condensable from non-condensable gas. In the gas cooler and the last cyclone, 9% of the remaining liquid disengages from non-condensable gases. Approximately one percent of contaminates, which are free of BioOil and wax, travel to the electrostatic precipitator, which is not part of the Hot Back End system. The Hot Back End system is very low in maintenance and operating costs.

The product tank 10, the first cyclone 12, the meandering pipe 16 and the gas tank 18 need to be kept hot in order to keep all the wax/resin and BioOil in a single phase. Next the wax/resin and BioOil are transferred to the gas cooler 24 and the last cyclone 26 to be chilled and condensed. The preferred temperature for each section of the Hot Back End System is as follows:

(1) Depending on the type of feedstock, the feed rate and the gas stream velocity, the product tank 10 operating temperature range is from 35 to 65° C. depending on the process condition mentioned above.

(2) The first cyclone 12 operating temperature range is from 30 to 60° C. depending on the process condition mentioned above.

(3) The meandering pipe 16 operating temperature range is from 30 to 60° C. depending on the process condition mentioned above.

(4) The gas tank 10 operating temperature range is from 30 to 50° C. depending on the process condition mentioned above. Up to this point the system has to be warm, otherwise wax/resin in the system separates and, if it cools down, the wax/resin viscosity will increase and cause a problem for the pump and instruments such as the level controller, the side glass and also the check valves.

(5) The gas cooler 24 operating temperature range is from 5 to 20° C. depending on the process condition mentioned above.

(6) The last cyclone 26 operating temperature range is from 7 to 25° C. depending on the process condition mentioned above.

The purpose and operating condition of each section of the Hot back End System depends on the type of feedstock, feed rate and gas stream velocity as follows:

The first cyclone 12 collects BioOil droplets, wax/resin, char and aerosol greater than 5 microns in size. This cyclone 12 collects 3 to 21% of the total BioOil production. The vapour velocity is in the range of 2000 to 8000 FPM with a pressure drop from 0.5 to 5 inch of water. By employing cyclone 12 and collecting the liquid, the load and pressure drop on the second stage of separation, namely, the meandering pipe, will be reduced.

The meandering pipe 16 and the gas tank 18 collect BioOil droplets, wax/resin, char and aerosol of sub micron dimensions and greater. The meandering pipe 16 and the gas tank 18 collect 4 to 14% of the total BioOil production. The vapour velocity in the meandering pipe 16 is in the range of 4000 to 16000 FPM. The pressure drop across the meandering pipe 16 is in the range of 5 to 100 inch of water. In the meandering pipe 16 all contaminates in the gas stream such as wax/resin, char and aerosol are substantially reduced or eliminated.

The gas tank 18 reduces the gas velocity for more retention time, which allows the droplets in the gas stream and from the meandering pipe 16 to settle down. The Vapour velocity in the gas tank is 10 to 40 FPM and the pressure drop is less than two inches of water. In special cases, a mesh pad can be installed at the outlet of the gas tank 18. There are no waxy contaminates to foul the mesh pad at the outlet of the gas tank 18.

The gas entering the gas cooler 24 is free of fouling contaminates (wax/resin). The gas cooler 24 chills down the vapour to substantially reduce or eliminate all condensate in the gas stream. Gas velocity in the gas cooler 24 is in the range of 1000 to 10000 FPM and the pressure drop is in the range of two to 20 inches of water. Plate, shell and tube or fin tube type heat exchangers (depending on the ambient temperature of the location) are all suitable.

The second cyclone 26 collects the condensate that has been re-entrained in the gas stream in the gas cooler 24. The gas velocity in this section is in the range of 4000 to 8000 FPM and the pressure drop 0.5 to 5 inches of water.

The condensate collected by the gas cooler and the last trap is rich in the organics mentioned in the analytical result table below and can be distilled, separated and recovered as a useful by-product.

An electrostatic precipitator (not shown) could follow the Hot Back End system to collect any escaped wax-free BioOil and escaped char. The size of this electrostatic precipitator is much smaller compared to that required without a Hot back end system.

EXAMPLES (APPLICATION OF THE INVENTION)

The following tables, illustrate several examples of thermolysis runs and the collector's performance.

TABLE 1

Sample examples of Hot Back End collection by devices in pyrolysis/thermolysis unit # 2 (15 tonne/day pre-commercial plant)

| | Percent of total BioOil production collected in each vessel | | | |
|---|---|---|---|---|
| Feed | Product tank | Cyclone#1 | Meandering pipe and gas tank | Gas cooler and Cyclone #2 |
| whitewood | 81.5 | 3.1 | 8.0 | 6.4 |
| whitewood | 77.1 | 4.4 | 5 | 12.8 |
| Whitewood/bark | 79.0 | 6.1 | 5.0 | 7.9 |
| Whitewood/bark | 83.0 | 5.3 | 4.2 | 6.4 |
| BioOil | | Viscous, BioOil, wax, Condensable and char | Viscous, BioOil, wax, Condensable and char | Yellowish condensate Free of BioOil and wax |

TABLE 2

Sample examples of Hot Back End collection by devices in pyrolysis/thermolysis unit # 1 (two tonne/day pilot plant)

| | Percent of total BioOil production collected in each vessel | | | |
|---|---|---|---|---|
| Feed | Product tank | Cyclone#1 | Meandering pipe and gas tank | Gas cooler |
| Fine bagasse | 79.6 | 3.8 | 5.8 | 10.8 |
| Semi-coarse bagasse | 70.7 | 10.7 | 11.2 | 7.3 |
| Coarse bagasse | 53 | 12.5 | 13.6 | 19.3 |
| Whitewood/bark | 62.8 | 20.6 | 6.9 | 6.9 |
| Whitewood/bark | 64.1 | 20.4 | 4.6 | 6.8 |
| | BioOil | Viscous, BioOil, wax, Condensable and char | Viscous, BioOil, wax, Condensable and char | Yellowish condensate Free of BioOil and wax |

TABLE 3

Analytical results of the liquid collected in each s ction of the Hot Back End from fifteen tonne per day pyrolysis/thermolysis unit

| Components | Cyclone#1 (1st stage) Wt % | Gas tank and meandering pipe Wt % | Cyclone#2 (last stage) Wt % |
|---|---|---|---|
| Char | 0.79 | 0.33 | 0.002 |
| H2O | 45.2 | 44.7 | 83.3 |

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. A method of continuously capturing BioOil and its constituents from a gas stream produced in a fast pyrolysis/thermolysis process, in a usable liquid form so as to produce a non-condensable gas free of fouling contaminates, comprising:
   (a) separating BioOil and its constituents from a gas stream using hot inertial separation to maintain the BioOil and its sticky and/or thick constituents at a temperature below its point of rapid degradation and above a point at which its viscosity is low enough to avoid inefficient operation of the separation equipment;
   (b) providing a settling section following said hot inertial separation step in which a gas temperature is low enough to cause droplets in the gas stream to settle out but with a gas temperature high enough so that a viscosity of said droplets remains low enough to avoid inefficient operation of the separation equipment; and
   (c) condensing vapour in the gas stream.

2. The method of claim 1, including collecting liquid from the gas stream produced by the pyrolysis/thermolysis process.

3. The method of claim 2, wherein the step of separating BioOil includes providing a first cyclone separator to collect liquid in a range of 5 microns and greater.

4. The method of claim 3, wherein the step of separating BioOil includes providing a meandering pipe following said first cyclone separator to collect liquid having a sub-micron particle range and greater.

5. The method of claim 3, including providing a BioOil, wax and char collection tank coupled to a discharge outlet of said first cyclone separator, operating in a temperature low enough to condense condensables but above a freezing point of said condensables to increase retention time of the gas stream.

6. The method of claim 1, wherein said settling section includes a gas tank.

7. The method of claim 1, wherein said condensing step takes place in a condensing section whose temperature is in a range of 5 to 20 degrees C.

8. The method of claim 7, wherein said condensation section includes a gas cooler.

9. The method of claim 8, including providing a second cyclone separator coupled to an outlet of said gas cooler operative to collect condensate that has been re-entrained in the gas stream in said gas cooler.

10. The method of claim 9 including providing a condensate collection tank coupled to an outlet of said second cyclone separator.

11. The method of claim 10, including return lines coupled to outlets of said first cyclone collection tank, said gas tank and said condensate collection tank operative to return collected liquid to the gas stream prior to the separation step.

12. Apparatus for continuously capturing BioOil and its constituents from a gas stream produced in a fast pyrolysis/thermolysis process, in a usable liquid form so as to produce a non-condensable gas free of fouling contaminates, comprising:
   (a) a separator operative to separate BioOil and its constituents from a gas stream and to maintain the temperature of said BioOil and its constituents such that its sticky and/or thick constituents are below a point of rapid degradation but above a point at which their viscosity is low enough to avoid inefficient operation of the separation equipment;
   (b) a gas retention apparatus having a gas flow path operative to cause droplets in the gas stream to settle out but with the gas at a temperature high enough so that a viscosity of said droplets remains low enough to avoid inefficient operation of the separation equipment; and
   (c) a condensing section coupled to an outlet of the gas retention apparatus operative to cool the gas to a temperature low enough to condense vapours into a free flowing liquid but above a freezing point of said liquids.

13. The apparatus of claim 12, wherein said separator is an inertial separator to collect liquid in a range of 5 microns and greater.

14. The apparatus of claim 13, wherein said inertial separator includes a first cyclone separator.

15. The apparatus of claim 12, including a product tank for storing liquid from said pyrolysis/thermolysis process and having an outlet coupled to an inlet of said first cyclone separator.

16. The apparatus of claim 12, wherein said separator further includes a meandering pipe coupled to an outlet of said inertial separator operative to collect BioOil droplets, wax, resin, char and aerosol in a sub-micron size and greater.

17. The apparatus of claim 14, including a first cyclone collection tank coupled to a discharge outlet of said first cyclone separator, said first cyclone collection tank operative to collect BioOil, wax and char.

18. The apparatus of claim 12, including a second cyclone separator coupled to an outlet of said gas cooler operative to separate out liquid that has been re-entrained in the gas stream.

19. The apparatus of claim 18, including a condensate collection tank coupled to an outlet of said second cyclone separator.

20. The apparatus of claim 19, including return lines coupled to outlets of said first cyclone collection tank, said gas tank and said condensate collection tank, operative to return collected liquid to said product tank.

* * * * *